United States Patent
Shibuya (10) Patent No.: US 10,788,415 B2
(45) Date of Patent: Sep. 29, 2020

(54) ANALYSIS DEVICE

(71) Applicant: HORIBA, Ltd., Kyoto (JP)

(72) Inventor: Kyoji Shibuya, Kyoto (JP)

(73) Assignee: HORIBA. LTD., Kyoto (JP)

( * ) Notice: Subject to any disclaimer, the term of this patent is extended or adjusted under 35 U.S.C. 154(b) by 0 days.

(21) Appl. No.: 16/157,799

(22) Filed: Oct. 11, 2018

(65) Prior Publication Data

US 2019/0113442 A1    Apr. 18, 2019

(30) Foreign Application Priority Data

Oct. 16, 2017  (JP) .................................. 2017-200633

(51) Int. Cl.
| | | |
|---|---|---|
| *G01N 21/03* | (2006.01) | |
| *G01N 21/59* | (2006.01) | |
| *G01N 21/39* | (2006.01) | |

(52) U.S. Cl.
CPC ........... *G01N 21/031* (2013.01); *G01N 21/59* (2013.01); *G01N 21/39* (2013.01); *G01N 2201/0668* (2013.01)

(58) Field of Classification Search
CPC ...... G01N 21/031; G01N 21/39; G01N 21/59; G01N 2201/0668
USPC ................................................. 356/432–448
See application file for complete search history.

(56) References Cited

U.S. PATENT DOCUMENTS

| | | | | |
|---|---|---|---|---|
| 5,815,276 | A  * | 9/1998 | Fry ........................ | G01N 21/05 |
|  |  |  |  | 356/437 |
| 6,611,333 | B1 * | 8/2003 | Uehara ................ | G01N 21/031 |
|  |  |  |  | 356/432 |
| 9,194,794 | B2 * | 11/2015 | Wilkins ............... | G01N 21/031 |

(Continued)

FOREIGN PATENT DOCUMENTS

| | | |
|---|---|---|
| DE | 4331847 A1 | 4/1994 |
| EP | 1167949 A1 | 1/2002 |

(Continued)

OTHER PUBLICATIONS

Wolfgang Gurlit et al., Lightweight Diode Laser Spectrometer CHILD (Compact High-altitude In-situ Laser Diode) for Balloonborne Measurements of Water Vapor and Methane, Applied OP, Optical Society of America, Washington, DC, US, Jan. 1, 2005, vol. 44, No. 1, pp. 91-102.

(Continued)

*Primary Examiner* — Tri T Ton
(74) *Attorney, Agent, or Firm* — Brooks Kushman RC.

(57) ABSTRACT

The present claimed invention makes it possible to simplify a structure of a multiple-reflection cell and to measure both a measuring objective component having a high concentration and a measuring objective component having a low concentration. The analysis device of this invention is to irradiate a light to a multiple-reflection cell into which a sample is introduced, to detect the light exiting from the multiple-reflection cell and to analyze a measuring objective component contained in the sample, and comprises a first light irradiation part that allows a first light to enter the (Continued)

multiple-reflection cell and a second light irradiation part that allows a second light to enter the multiple-reflection cell. The multiple-reflection cell has a pair of reflecting mirrors that reflect the first light and the second light.

12 Claims, 8 Drawing Sheets

(56) References Cited

U.S. PATENT DOCUMENTS

| | | | | |
|---|---|---|---|---|
| 2011/0299083 | A1* | 12/2011 | Yokoyama | G01J 3/02 356/432 |
| 2013/0278922 | A1* | 10/2013 | Gelernt | G02B 21/16 356/51 |

FOREIGN PATENT DOCUMENTS

| | | |
|---|---|---|
| WO | 2008079032 A2 | 7/2008 |
| WO | 2011/114096 A2 | 9/2011 |

OTHER PUBLICATIONS

Tarsitano C G et al., Multilaser Herriott Cell for Planetary Tunable Laser Spectrometers, Applied Optics, Optical Society of America, Washington, DC; US, Oct. 1, 2007, vol. 46, No. 28, pp. 6923-6935.
EESR dated Dec. 21, 2018 issued for European patent application No. 18 200 375.6.

* cited by examiner

ANALYSIS DEVICE

CROSS-REFERENCE TO RELATED APPLICATION

This application claims priority to Japanese Application No. 2017-200633, filed Oct. 16, 2017, the disclosure of which is incorporated in its entirety by reference herein.

FIELD OF THE ART

This invention relates to an analysis device using a multiple-reflection cell.

BACKGROUND ART

Conventionally, an analysis device that analyzes a measuring objective component contained in a sample uses a multiple-reflection cell such as a white cell or a Heriot cell. By using the multiple-reflection cell, it is possible to elongate an optical path length without increasing the cell in size. As this result, it is possible to enlarge a detection signal such as the measuring objective component having a low concentration, resulting in improvement of measurement accuracy.

As shown in the patent document conceived is the Heriot cell using an astigmatic mirror whose cell body of the multiple-reflection cell is provided with a pair of mirrors for a long optical path and a pair of mirrors for a short optical path. With this arrangement, a dynamic range is enlarged by realizing the long optical path and the short optical path for a single multiple-reflection cell.

However, this arrangement requires a pair of the mirrors for the long optical path and a pair of the mirrors for the short optical path so that not only the structure of the multiple-reflection cell is complicated but also an inner volume of the multiple-reflection cell increases.

PRIOR ART DOCUMENT

Patent Document

Patent document 1: WO 2011/114096

DISCLOSURE OF THE INVENTION

Problems to be Solved by the Invention

The present claimed invention intends to solve all of the problems and a main object of this invention is to simplify a structure of the multiple-reflection cell and to make it possible to measure both a measuring objective component having a high concentration and a measuring objective component having a low concentration.

Means to Solve the Problems

More specifically, an analysis device in accordance with this invention is an analysis device that irradiates a light to a multiple-reflection cell into which a sample is introduced, detects the light exiting from the multiple-reflection cell and analyzes a measurement objective component contained in the sample, and is characterized by comprising a first light irradiation part that allows a first light to enter the multiple-reflection cell, and a second light irradiation part that allows a second light whose incident optical path is different from that of the first light to enter the multiple-reflection cell, and the multiple-reflection cell has a pair of reflecting mirrors that reflect the first light and the second light.

In accordance with this invention, since the analysis device has a pair of the reflecting mirrors that reflect the first light and the second light each having mutually different incident optical paths, it is possible to make the number of reflections of the first light by a pair of the reflecting mirrors and the number of reflections of the second light by a pair of the reflecting mirrors different from each other. Accordingly, it is possible to simplify the structure of the multiple-reflection cell and to measure both the measuring objective component having a high concentration and the measuring objective component having a low concentration. In addition, since the structure of the multiple-reflection cell can be simplified, it is possible to make the internal volume of the multiple-reflection cell small and to make a substitution rate of the sample gas fast, thereby improving responsiveness. Furthermore, since the analysis device has the first light irradiation part and the second light irradiation part, it is possible to allow the first light and the second light to enter the multiple-reflection cell simultaneously. With this arrangement, it is possible to measure both the measuring objective component having a high concentration and the measuring objective component having a low concentration simultaneously. In addition, it is also possible to measure a plurality of measuring objective components simultaneously by making a wavelength bandwidth of the first light and a wavelength bandwidth of the second light different from each other.

In order to simplify the structure of the analysis device by arranging the optical system such as the light irradiation part and the photoelectric detector on one side of the multiple-reflection cell, it is preferable that the multiple-reflection cell has an arrangement wherein the first light and the second light enter from one of a pair of the reflecting mirrors and the first light and the second light exit from the same reflecting mirror.

With this arrangement, it is preferable that an inlet and an outlet of the first light and an inlet and an outlet of the second light are formed on at least one of a pair of the reflecting mirrors. In accordance with this arrangement, there is no need of providing the cell body housing a pair of the reflecting mirrors with the inlet and the outlet in the outside of the reflecting mirrors in a front view of the reflecting mirror, it is possible to downsize the multiple-reflection cell.

In this case, in order to prevent the other light from unexpectedly going out from the inlet or the outlet of one light, it is preferable that a position where each of the inlet and the outlet of the first light is formed is different from a reflecting position of the second light by a pair of the reflecting mirrors, and a position where each of the inlet and the outlet of the second light is formed is different from a reflecting position of the first light by a pair of the reflecting mirrors.

It is preferable that the inlet and the outlet of the first light and the inlet and the outlet of the second light are formed on only one of a pair of the reflecting mirrors. In accordance with this arrangement, it is possible to simplify the structure of the other reflecting mirror. In addition, in case that the multiple-reflection cell has a cell body that houses a pair of the reflecting mirrors and that has an introducing port from which the sample is introduced and a discharging port from which the sample is discharged, the cell body may have the optical window member to input or output the first light and the second light only on one side of the cell body, it is possible to simplify the structure of the cell body.

In order to further simplify the structure of the cell body, it is preferable that the cell body has one optical window member from which the first light and the second light enter and exit.

In order to widen the measurement range from a low concentration to a high concentration, it is preferable that the first light is reflected at multiple times by a pair of the reflecting mirrors and outputted, and the second light is reflected at a number of multiple times smaller than that of the first light by a pair of the reflecting mirrors, or reflected at once by one of a pair of the reflecting mirrors and outputted.

Effect of the Invention

In accordance with the above-mentioned invention, it is possible to measure both the measuring objective component having a high concentration and the measuring objective component having a low concentration, while simplifying the structure of the multiple-reflection cell.

BEST MODES OF EMBODYING THE INVENTION

An analysis device 100 in accordance with one embodiment of this invention will be explained with reference to drawings.

Figure 1:
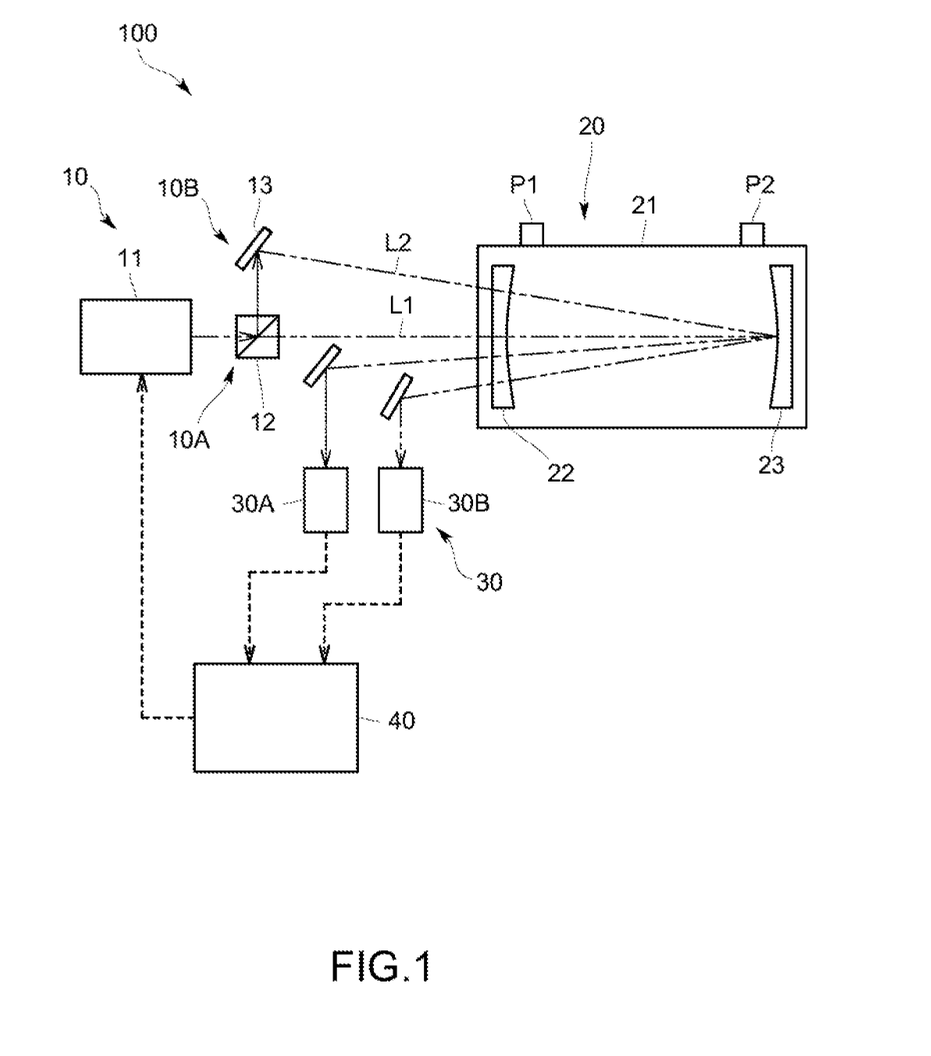
FIG. 1 is an overall view of an analysis device in accordance with one embodiment of this invention.

The analysis device 100 of this embodiment is a concentration measurement device that measures a concentration of a measuring objective component (for example, CO, $CO_2$, $N_2O$, NO, $NO_2$, $H_2O$, $SO_2$, $CH_4$, $NH_3$ or the like in this embodiment) contained in a sample gas such as an exhaust gas from, for example, an internal combustion engine, and as concretely shown in FIG. 1, comprises a light irradiation part 10, a multiple-reflection cell 20 into which the sample gas is introduced and where a light from the light irradiation part 10 is reflected at multiple times, a photoelectric detecting part 30 that detects the light exiting from the multiple-reflection cell 20 and an information processing unit 40 that analyzes the measuring objective component contained in the sample gas based on a light intensity signal detected by the photoelectric detecting part 30.

The light irradiation part 10 comprises a first light irradiation part 10A that allows a first light L1 to enter the multiple-reflection cell 20 and a second light irradiation part 10B that allows a second light L2 whose incident optical path is different from that of the first light L1 to enter the multiple-reflection cell 20. That the incident optical path is different includes that the optical paths are separated each other even though an incident angle to the multiple-reflection cell 20 is the same in addition to that an incident angle to the multiple-reflection cell 20 is different.

In this embodiment both the first light irradiation part 10A and the second light irradiation part 10B have a common semiconductor laser 11 as a light source. Concretely, both the first light irradiation part 10A and the second light irradiation part 10B comprise a common semiconductor laser 11 and a common beam splitter 12 that divides the laser light irradiated from the semiconductor laser 11 into two. One laser light divided by the beam splitter 12 becomes the first light L1 and the divided other laser light becomes the second light L2. The second light irradiation part 10B is further provided with an optical element 13 that introduces the other light into the multiple-reflection cell 20. As mentioned, since the common semiconductor laser 11 is used, the first light irradiation part 10A and the second light irradiation part 10B allow the first light L1 and second light L2 to enter the multiple-reflection cell 20 simultaneously.

The first light irradiation part 10A and the second light irradiation part 10B may have a semiconductor laser respectively without commonizing the semiconductor laser. In this case, no beam splitter 12 is required. In addition, if one laser light divided by the beam splitter 12 directly enters the multiple-reflection cell 20, an optical element such as a mirror is not required for the first light irradiation part 10. Otherwise, similar to the second light irradiation part 10B, the first light irradiation part 10A may have an optical element such as a mirror that introduces the other light into the multiple-reflection cell 20.

The semiconductor laser 11 is a QCL (Quantum Cascade Laser), and oscillates a laser beam of middle infrared (4 μm~10 μm). The semiconductor laser 11 can modulate (change) an oscillation wavelength by a given electric current (or a voltage). As far as the oscillation wavelength is variable, a laser of other type may be used, and a temperature may be changed in order to change the oscillation wavelength.

Figure 2:
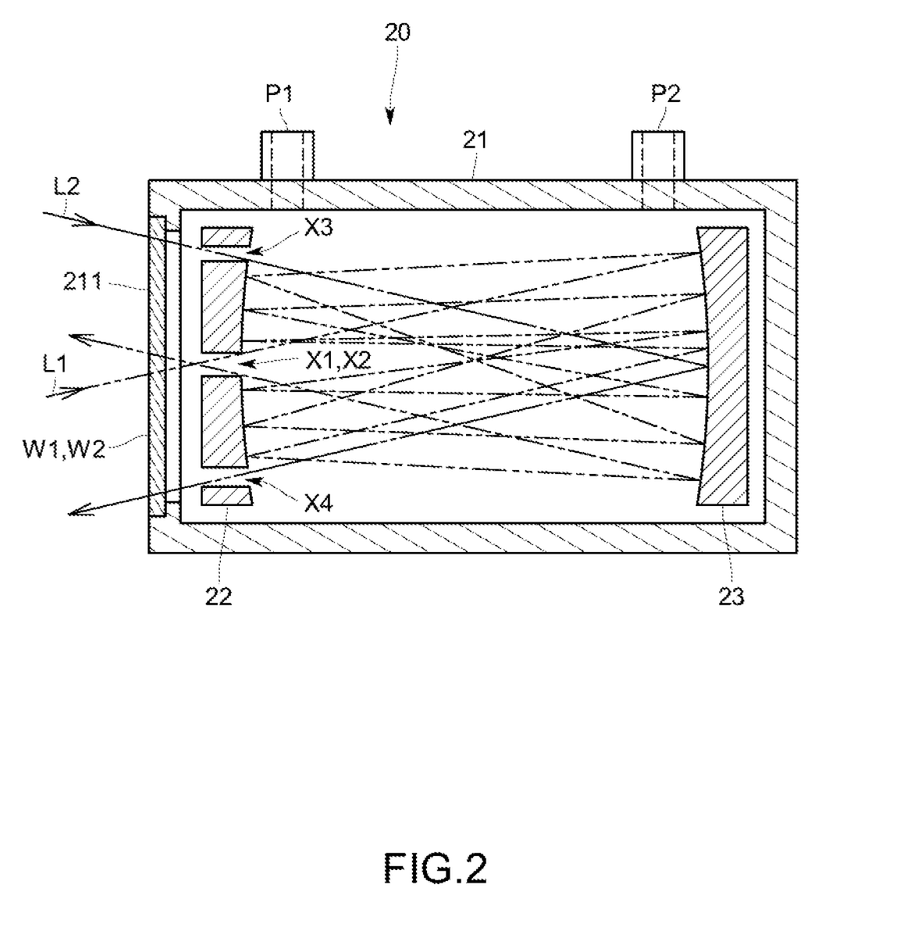
FIG. 2 is a cross-sectional view showing a configuration of a multiple-reflection cell of this embodiment.

The multiple-reflection cell 20 is, as shown in FIG. 2, of a type of, so called, a Heriot cell. The multiple-reflection cell 20 comprises a cell body having an internal space (S) into which the sample gas is introduced and a pair of reflecting mirrors 22, 23 arranged to face each other inside of the cell body 21.

The cell body 21 is provided with an introducing port P1 through which the sample gas is introduced into the internal space (S) and a discharging port P2 through which the sample gas is discharged from the internal space (S). In addition, an incident window W1 for allowing the light L1, L2 from the first light irradiation part 10A and the second light irradiation part 10B to enter, and an exit window W2 for allowing the laser light reflected by a pair of the reflecting mirrors 22, 23 to exit to the outside are formed on the cell body 21.

The incident window W1 and the exit window W2 are composed of a single optical window member 211. The optical window member 211 is made of a transparent material such as quartz, calcium fluoride, barium fluoride wherein almost no absorption in an absorption wavelength band of the measuring objective component contained in the sample gas.

A pair of the reflecting mirrors 22, 23 are arranged to face each other in the internal space (S) of the cell body 21, and reflect the first light L1 and the second light L2. The reflecting mirrors 22, 23 in this embodiment use an aspherical mirror such as a toroidal mirror wherein a radius of curvature of two axes that are orthogonal with each other differs each other, however, a spherical surface mirror may be used. In this case, if the toroidal mirror is used, it is possible to improve an efficiency of utilization of the mirror by focusing the light spot in an area where the reflecting surface locates, resulting in downsizing the mirror. In addition, a pair of the reflecting mirrors 22, 23 have the same shape of the mirror surface, however, the reflecting mirrors 22, 23 have a different shape of the mirror surface.

One reflecting mirror 22 is provided with an inlet X1 to input the first light L1 into a space between a pair of the reflecting mirrors 22, 23, an outlet X2 to output the first light L1 to the outside of the space between the reflecting mirrors 22, 23, an inlet X3 to input the second light L2 into the space between a pair of the reflecting mirrors 22, 23 and an outlet X4 to output the second light L2 to the outside of the space between the reflecting mirrors 22, 23. As mentioned, since the inlet X1 and the outlet S2 for the first light L1 and the inlet X3 and the outlet X4 for the second light L2 are formed only on the reflecting mirror 22, it is possible to simplify the structure of the other reflecting mirror 23.

In this embodiment, the first light L1 entering from the inlet X1 exits from the outlet X2 after reflecting at multiple times by reflecting surfaces of a pair of the reflecting mirrors 22, 23. In addition, the second light L2 entering from the inlet X3 exits from the outlet X4 after reflecting once by the reflecting surface of the other reflecting mirror 23. In other words, the second light L2 of this embodiment is not reflected by the reflecting mirror 22. In addition, the entering direction and the exiting direction of the second light L2 are so formed between a plane where the entering direction of the first light L1 passes and a plane where the exiting direction of the first light L1 passes.

Figure 3:
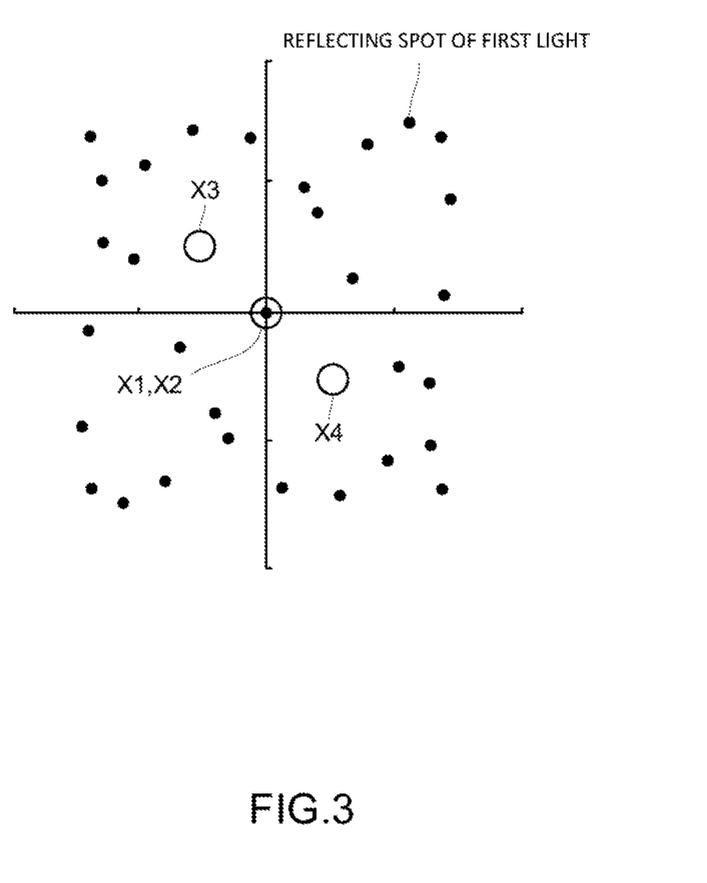
FIG. 3 is a front view showing a positional relationship among a reflecting position, an inlet and an outlet on one of the reflecting mirrors in this embodiment.

A positional relationship between the reflecting spots (reflecting positions) of the first light L1 and each of the inlets and the outlets X1~X4 of the reflecting mirror 22 is shown in FIG. 3. Each of the positions where the inlet X1 and the outlet X2 for the first light L1 are formed is different from a position where the second light L2 is reflected by the reflecting mirror 23. In addition, each of the positions where the inlet X3 and the outlet X4 for the second light L2 are formed is different from a position where the first light L1 is reflected by a pair of the reflecting mirrors 22, 23. More concretely, each of the inlet X3 and the outlet X4 for the second light L2 is formed on the reflecting mirror 22 at a part where there is no reflecting spot for the first light L1. Then, the reflecting surface of the reflecting mirror 22 is so designed that the inlet X3 and the outlet X4 of the second light L2 can be formed on the part where there is no reflecting spot for the first light L1.

In addition, in this embodiment, each of the inlet X1 and the outlet X2 for the first light L1 is formed by a common through bore formed on a center part of the reflecting mirror 22. In addition, the inlet X3 and the outlet X4 for the second light L2 are formed at symmetrical positions across the inlet X1 (the outlet X2) of the first light L1.

The photoelectric detecting part 30 comprises a first photoelectric detector 30A that detects the first light L1 exiting from the multiple-reflection cell 20 and a second photoelectric detector 30B that detects the second light L2 exiting from the multiple-reflection cell 20. The first photoelectric detector 30A and the second photoelectric detector 30B of this embodiment use a thermal type sensor such as a thermopile that is comparatively inexpensive, however, a high responsive quantum type photoelectric element such a HgCdTe, InGaAs, InAsSb or PbSe may be used.

Figure 4:
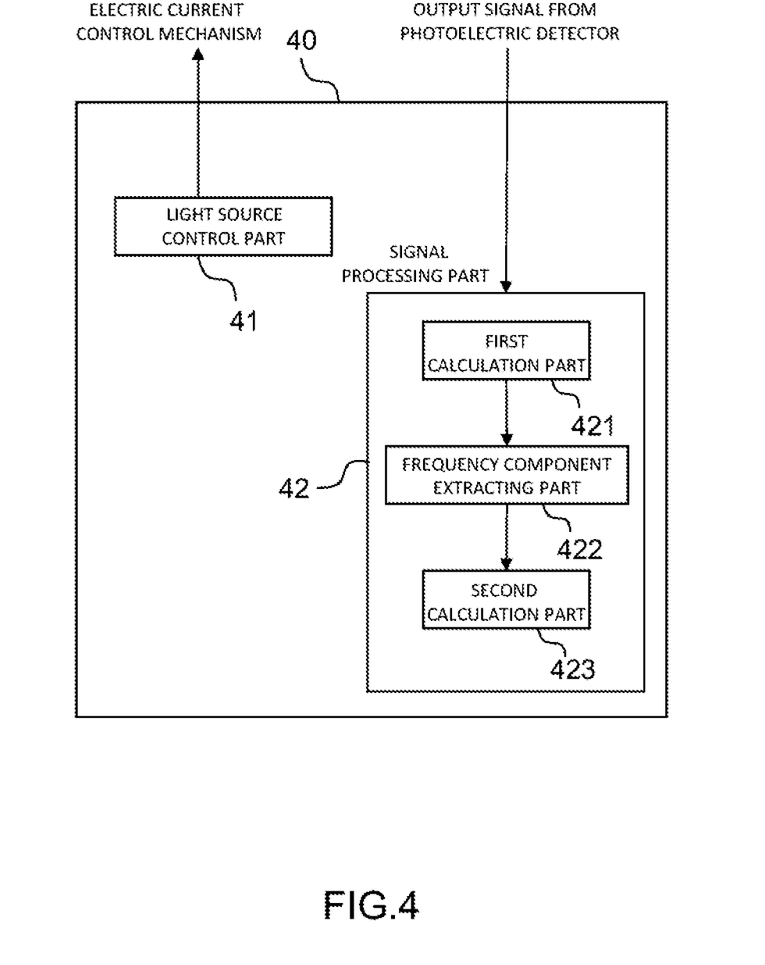
FIG. 4 is a function block diagram of an information processing unit in this embodiment.

The information processing unit 40 comprises an analog electric circuit having a buffer and an amplifier, a digital electric circuit having a CPU and a memory, an AD converter and a DA converter that mediate between the analog electric circuit and the digital electric circuit. The information processing unit 40 receives an output signal from a light source control part 41 that controls an output of the semiconductor laser 2 or the photoelectric detectors 30A, 30B and produces a function as a signal processing part 42 that conducts an arithmetic processing on a value of the output signal and calculates a concentration of the measuring objective component by cooperatively operating the CPU and its peripheral devices according to predetermined programs stored in a predetermined area of the memory.

Each part will be explained.

The light source control part 41 controls a current source (or a voltage source) of the semiconductor laser 11 by outputting a current (or a voltage) control signal. The light source control part 41 changes a driving current (or a driving voltage) by the use of a predetermined frequency, and consequently modulates the oscillation wavelength of the laser light output from the semiconductor laser 11 by the use of the predetermined frequency.

Figure 5:
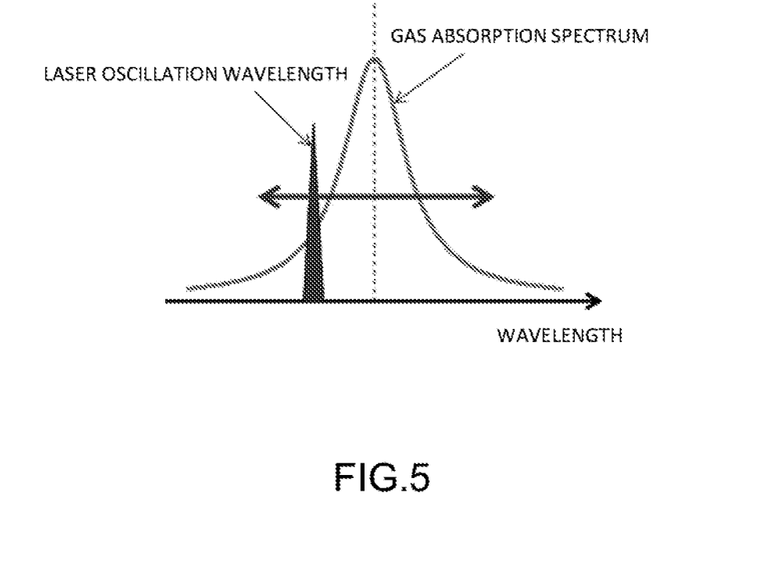
FIG. 5 is a pattern view showing a modulation method of a laser oscillation wavelength in this embodiment.
Figure 6:
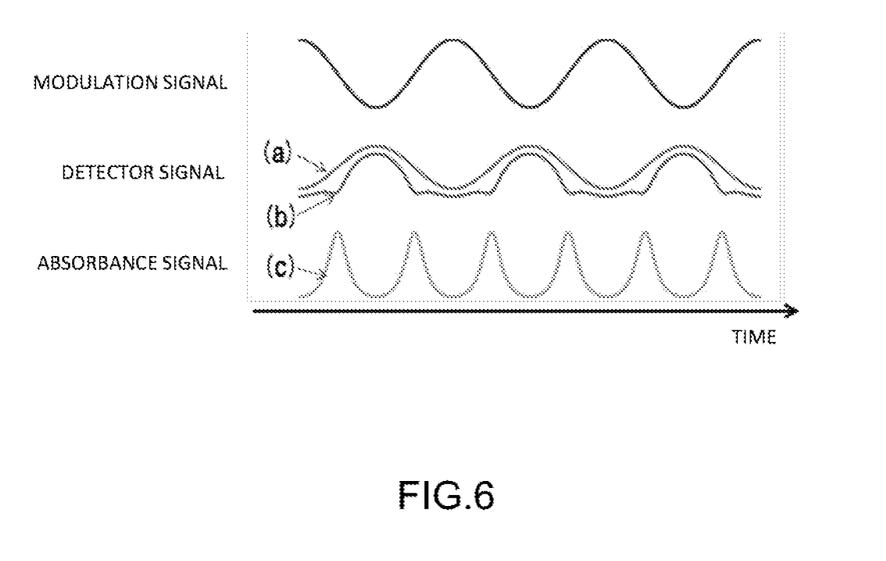
FIG. 6 is a view showing a driving electric current (voltage) and a modulation signal in this embodiment.

In this embodiment, the light source control part 41 changes the driving current in a sine wave shape and modulates the above-mentioned oscillation frequency in the sine wave shape (refer to a modulation signal in FIG. 6). In addition, as shown in FIG. 5, the oscillation wavelength of the laser light is moderated with a peak of an absorbance spectrum of the measuring objective component as the center. The first light irradiation part 10A and the second light irradiation part 10B allows the first light L1 and the second light L2 to enter the multiple-reflection cell 20 at once by the semiconductor laser 11 being controlled by the light source control part 41. That the first light L1 and the second light L2 enter at once may include a state wherein the first light L1 and the second light L2 exist in the multiple-reflection cell 20 instantaneously even though the timing when the first light L1 and the second light L2 enter the multiple-reflection cell 20 is not completely the same.

The signal processing part 42 comprises a first calculation part 421, a frequency component extracting part 422 and a second calculation part 423.

The first calculation part 421 calculates a logarithm of a ratio between a light intensity of the laser light (hereinafter also called as the measuring objective light) passing the multiple-reflection cell 20 in a state wherein the sample gas is enclosed in the multiple-reflection cell 20 and the light absorption due to the measuring objective component generates in the multiple-reflection cell 20 and the light intensity of the laser light passing the multiple-reflection cell 20 in a state wherein the light absorption is substantially zero.

More specifically explained, both of the former light intensity and the later light intensity are measured by the photoelectric detectors 30A, 30B, and measured result data are stored in a predetermined area of the memory, and the first calculation part 421 calculates the above-mentioned logarithm of the ratio of the light intensity by referring the measured result data.

The measurement of the former light intensity (hereinafter also called as the sample measurement) is, as a matter of course, conducted for each sample gas. The measurement of the later light intensity (hereinafter also called as the reference measurement) may be conducted before or after the sample measurement, or at any appropriate timing, for example, the measurement is conducted only once and the measured result is stored in the memory and the stored measured result is used commonly for each sample measurement.

In this embodiment, in order to make the light absorption substantially zero a zero gas whose light absorption is substantially zero in a wavelength bandwidth wherein the light absorption of the measuring objective component is observed, for example, $N_2$ gas is enclosed in the multiple-reflection cell 20, however, other gas may be enclosed, or inside of the multiple-reflection cell 20 may be vacuumed.

The frequency component extracting part 422 conducts lock-in detection on the logarithm of the ratio of the light intensity (hereinafter also called as the absorbance signal) calculated by the first calculation part 421 by the use of the reference signal having a frequency of n (n is an integer number more than or equal to 1) times as many as the modulation frequency, and extracts the frequency component owned by the reference signal based on the logarithm of the ratio of the light intensity. The lock-in detection may be conducted not only by a digital operation but also by an arithmetic operation using an analog circuit. In addition, the extraction of the frequency component is not only the lock-in detection but also using a method of, for example, Fourier series development.

The second calculation part 423 calculates a concentration of the measuring objective component based on a detection result by the frequency component extracting part 422.

Next, one example of an operation of the analysis device 100 will be explained together with an explanation of each component in detail.

First, as mentioned above, the light source control part 41 controls the semiconductor laser 11 and modulates the wavelength of the laser light with the peak of the absorbance spectrum of the measuring objective component as the center by the modulation frequency.

Next, when the zero gas is enclosed in the multiple-reflection cell 20 by an operator or automatically, the first calculation part 421 detects it and conducts the reference measurement.

Concretely, the first calculation part 421 receives the output signal from the photoelectric detectors 30A, 30B in a state that the zero gas is enclosed in the multiple-reflection cell 20, and stores the value of the output signal in the measured result data storing part. The value of the output signal from the photoelectric detectors 30A, 30B while conducting the reference measurement, namely the reference light intensity expressed in a chronological graph is shown in FIG. 6(a). More specifically, only the change of the light output modulated due to the driving electric current (voltage) of the laser light is shown in the output signal of the photoelectric detectors 30A, 30B.

Then, when the sample gas is enclosed inside of the multiple-reflection cell 20 by the operator or automatically, the first calculation part 421 conducts the sample measurement. Concretely, the first calculation part 421 receives the output signal from the photoelectric detectors 30A, 30B in a state that the sample gas is enclosed in the multiple-reflection cell 20, and stores the value of the output signal in a predetermined area of the memory. The value of the output signal from the photoelectric detectors 30A, 30B while conducting the sample measurement, namely the measuring objective light intensity expressed in a chronological graph is shown in FIG. 6(b). It becomes clear that the peak due to absorption appears for every half cycle of the modulation.

Next, the first calculation part 421 calculates the intensity ratio logarithm between the light intensity of the measuring objective light and the light intensity of the reference light by synchronizing each measuring data to the modulation cycle. Concretely, an operation equal to the following expression (Expression 1) is conducted.

$$A(t) = -\ln\left(\frac{D_m(t)}{D_z(t)}\right) \quad \text{Expression 1}$$

Wherein, $D_m(t)$ is the intensity of the measuring objective light, $D_z(t)$ is the light intensity of the reference light, and A (t) is the intensity ratio logarithm (absorbance signal). A graph with the absorbance signal plotted as the horizontal axis is shown in FIG. 6(c).

As a method for obtaining the light intensity ratio logarithm, the intensity ratio logarithm may be obtained after calculating the ratio between the measuring object light intensity and the reference light intensity, or the logarithm of the measuring objective light intensity and the logarithm of the reference light intensity may be obtained respectively and then the difference therebetween may be obtained.

Next, the frequency component extracting part 422 conducts lock-in detection on the light intensity ratio logarithm by the use of the reference signal having the frequency as being twice as many as the modulation frequency, more specifically, extracts the frequency component as being twice as many as the modulation frequency, and stores the data (hereinafter also called as the lock-in data) in the predetermined area of the memory. The frequency component extracting part 422 may conduct lock-in detection by the use of the reference signal having the frequency of, for example, three or more other integral multiple of modulation frequency. In addition, the lock-in data may be obtained by subtracting a logarithm of the reference light intensity on which lock-in detection is conducted from a logarithm of the measurement objective light on which lock-in detection is conducted.

The value of the lock-in data becomes a value proportional to the concentration of the measuring objective component, and the second calculation part 423 calculates a concentration indication value indicating the concentration of the measuring objective component based on the value of the lock-in data.

In accordance with this arrangement, even though the laser light intensity fluctuates due to some factors, a certain offset is just added to the above-mentioned intensity ratio logarithm and the waveform does not change. Accordingly, since the value of each frequency component calculated with the procedure of the lock-in detection does not change and the concentration indication value does not change, it is possible to expect an accurate measurement.

The detailed reason will be explained as follows.

Generally, when an absorbance signal A (t) is developed by Fourier series development, it is represented by the following expression (Expression 2).

Here, $a_n$ is a value proportion to the concentration of the measuring objective component in the expression (2), and the second calculation part 423 calculates the concentration indication value indicating the concentration of the measuring objective component based on the value an.

$$A(t) = a_0 + \sum_{n=1}^{\infty} a_n \cos(2\pi n f_m t + \phi_n) \quad \text{Expression 2}$$

Wherein, $f_m$ is a modulation frequency, and n is a multiple of the modulation frequency.

Meanwhile, A (t) is also expressed by the above-mentioned (Expression 1).

Next, in case that the laser light intensity fluctuates α times due to some elements during the measurement, the absorbance signal A' (t) is expressed by the following expression (Expression 3).

$$A'(t) = -\ln\left(\frac{\alpha D_m(t)}{D_z(t)}\right) = -\ln\left(\frac{D_m(t)}{D_z(t)}\right) - \ln(\alpha) = A(t) - \ln(\alpha) \qquad \text{Expression 3}$$

As is clear from the expression (Expression 3), A' (t) is a value wherein $-\ln(\alpha)$ as being a constant value is added to the absorbance signal A (t) in case that there is no fluctuation in the laser light intensity. Accordingly, it becomes clear that the value $a_n$ of each frequency component does not change even though the laser light intensity changes.

Accordingly, there is no influence on the concentration indication value determined based on the value of the frequency component as being twice as many as the modulation frequency.

The above is an example of the operation of the analysis device 100 in case that no interference component other than the measuring objective component is contained in the sample gas.

Next, an example of the operation of the analysis device 100 will be explained in case that one or more interference components (for example, $H_2O$) having the light absorption in the peak light absorption wavelength of the measuring objective component are contained in the sample gas.

First, a principle will be explained.

Since the light absorption spectrum of the measuring objective component is different from that of the interference component, a waveform of each absorbance signal in case that the component exists by itself differs each other and a ratio of each frequency component differs (linearly independent). By making use of this, it is possible to obtain the concentration of the measuring objective component whose interference influence is corrected by solving simultaneous equations by the use of the relationship of each frequency component between the absorbance signal of the previously obtained measuring objective component and that of the interference component.

When each of the absorbance signal per unit concentration in case that each of the measuring objective component and the interference component exists by itself respectively is expressed by $A_m$ (t), $A_i$ (t) and each frequency component of the absorbance signal is expressed by $a_{nm}$, $a_{ni}$, the following expressions (Expression 4, Expression 5) are established.

$$A_m(t) = a_{0m} + \sum_{n=1}^{\infty} a_{nm}\cos(2\pi n f_m t + \phi_n) \qquad \text{Expression 4}$$

$$A_i(t) = a_{0i} + \sum_{n=1}^{\infty} a_{ni}\cos(2\pi n f_m t + \phi_n) \qquad \text{Expression 5}$$

The absorbance signal A (t) in case that the concentration of each of the measuring objective component and the interference component is $C_m$, $C_i$ respectively is expressed by the following expression (Expression 6) due to linearity of each absorbance.

$$\begin{aligned}A(t) &= C_m A_m(t) + C_i A_i(t) \qquad \text{Expression 6}\\ &= C_m\left(a_{0m} + \sum_{n=1}^{\infty} a_{nm}\cos(2\pi n f_m t + \phi_n)\right) + \\ &\quad C_i\left(a_{0i} + \sum_{n=1}^{\infty} a_{ni}\cos(2\pi n f_m t + \phi_n)\right)\\ &= a_{0m}C_m + a_{0i}C_i + \\ &\quad \sum_{n=1}^{\infty} (a_{nm}C_m + a_{ni}C_i)\cos(2\pi n f_m t + \phi_n)\end{aligned}$$

Wherein, if each of the frequency component of $f_m$ and $2f_m$ of A (t) is $a_1$, $a_2$ respectively, the following simultaneous equations (Expression 7) are established due to the above mentioned (Expression 6).

$$a_{1m}C_m + a_{1i}C_i = a_1$$

$$a_{2m}C_m + a_{2i}C_i = a_2 \qquad \text{Expression 7}$$

If each span gas is flown in advance, since it is possible to previously obtain each frequency component $a_{nm}$, $a_{ni}$ (n is a natural number, and n=1, 2 in this embodiment) in case that each of the measuring objective component and the interference component exists by itself respectively, the concentration $C_m$ of the measuring objective gas from which the interference influence is removed can be determined by a simple and secure arithmetic operation just by solving the above simultaneous equations (Expression 7).

The analysis device 100 runs based on the above-mentioned principle.

More specifically, the analysis device 100 measures in advance and stores the frequency component $a_{1m}$, $a_{2m}$, $a_{1i}$, $a_{2i}$ of each absorbance signal in case that each of the measuring objective component and the interference component exists by itself in the predetermined area of the memory by flowing the span gas in advance. More concretely, similar to the above-mentioned example, the analysis device 100 measures the measuring objective light intensity and the reference light intensity for each of the measuring objective component and the interference component, calculates these intensity ratio logarithm (absorbance signal), obtains each frequency component $a_{1m}$, $a_{2m}$, $a_{1i}$, $a_{2i}$ by means of the lock-in detection based on the intensity ratio logarithm and stores them. In addition to the above-mentioned, the analysis device 100 may calculate the frequency component $a_{1m}$, $a_{2m}$, $a_{1i}$, $a_{2i}$ by the use of the above-mentioned expression (Expression 4) by storing the absorbance signal $A_m$ (t), $A_i$ (t) per unit concentration.

The analysis device 100 specifies the measuring objective component and the interference component by the input of the operator.

Next, the first calculation part 421 calculates the intensity ratio logarithm A (t) according to the expression (Expression 1).

Then, the frequency component extracting part 422 conducts the lock-in detection on the intensity ratio logarithm by the use of the reference signal having the modulation frequency $f_m$ and twice frequency $2f_m$ as many as the modulation frequency, extracts each frequency component $a_1$, $a_2$ (lock-in data) and stores the extracted frequency component $a_1$, $a_2$ in the predetermined area of the memory.

Then, the second calculation part 423 applies the values of the lock-in data $a_1$, $a_2$ and the values of the frequency component $a_{1m}$, $a_{2m}$, $a_{1i}$, $a_{21}$, stored in the memory to the above-mentioned expression (Expression 7), or conducts an arithmetic operation equal to this, and calculates the concentration (or the concentration indication value) $C_m$ indicating the concentration of the measuring objective gas from which the interference influence is removed. At this time, the concentration (or the concentration indication value) $C_i$ of each interference component may be calculated.

Also in case wherein two or more interference components exist, if higher order frequency components whose number corresponds to the number of the interference components are added, it is possible to determine the concentration of the measuring objective component from which the interference influence is removed by solving the simultaneous equations whose number of unknowns is the same as the number of the type of the component.

More specifically, generally in case n types of gasses exist in the measuring objective component and the interference component, if the frequency component of $i \times f_m$ of the k-th gas type is $a_{ik}$, and the concentration of the k-th gas type is $C_k$, the following expression (Expression 8) is established.

$$a_{11}C_1 + a_{12}c_2 + a_{13}C_3 + \ldots + a_{1n}C_n = a_1$$
$$a_{21}C_1 + a_{22}c_2 + a_{23}C_3 + \ldots + a_{2n}C_n = a_2$$
$$a_{31}C_1 + a_{32}c_2 + a_{33}C_3 + \ldots + a_{3n}C_n = a_3$$
$$\vdots$$
$$a_{n1}C_1 + a_{n2}c_2 + a_{n3}C_3 + \ldots + a_{nn}C_n = a_n$$

Expression 8

If the simultaneous equations with n unknowns expressed by this expression (Expression 8) is solved, it is possible to determine the concentration of each gas in the measuring objective component and the interference component.

In addition, a higher harmonic component of a degree higher than n may be also added to create simultaneous equations with unknowns whose number is bigger than the number of the gas types and each gas concentration may be determined by the use of the least squares method. With this procedure, it is possible to determine the concentration of the component with less error due to the measurement noise.

In accordance with the analysis device 100 of this embodiment, since the analysis device 100 has a pair of the reflecting mirrors 22, 23 that reflect the first light L1 and the second light L2 each having mutually different incident optical paths, it is possible to make the number of reflections of the first light L1 by a pair of the reflecting mirrors 22, 23 and the number of reflections of the second light L2 different from each other. Accordingly, it is possible to simplify the structure of the multiple-reflection cell 22 and to measure both the measuring objective component having a high concentration and the measuring objective component having a low concentration. In addition, since the structure of the multiple-reflection cell 20 can be simplified, it is possible to make the internal volume of the multiple-reflection cell 20 small and to make a substitution rate of the sample gas fast, thereby improving the responsiveness. Furthermore, since the analysis device 100 has the first light irradiation part 10A and the second light irradiation part 10B, it is possible to allow the first light L1 and the second light L2 to enter the multiple-reflection cell 20 simultaneously. With this arrangement, it is possible to measure both high concentration and low concentration of a single measuring objective component simultaneously and to widen a measurement range.

This invention is not limited to the above-mentioned embodiment.

For example, the inlet X1 and the outlet X2 of the first light L1 and the inlet X3 and the outlet X4 of the second light L2 are formed on the reflecting mirror 22 in the above-mentioned embodiment, however, at least one of them may be formed on the other reflecting mirror 23.

In addition, the second light L2 having a short optical path reflects once in the above-mentioned embodiment, however, the number of reflections of the second light L2 may be any as long as the number is less than that of the first light L1.

Furthermore, the inlet X1 and the outlet X2 of the first light L1 are formed by a common through bore in the above-mentioned embodiment, however, they may be formed by separate through bores, or the inlet X3 and the outlet X4 of the second light L2 may be formed by a common through bore. In addition, the inlet or the outlet of the first light L1 and the second light L2 may be formed by a common through bore, or all of them may be formed by a common through bore.

Figure 7:
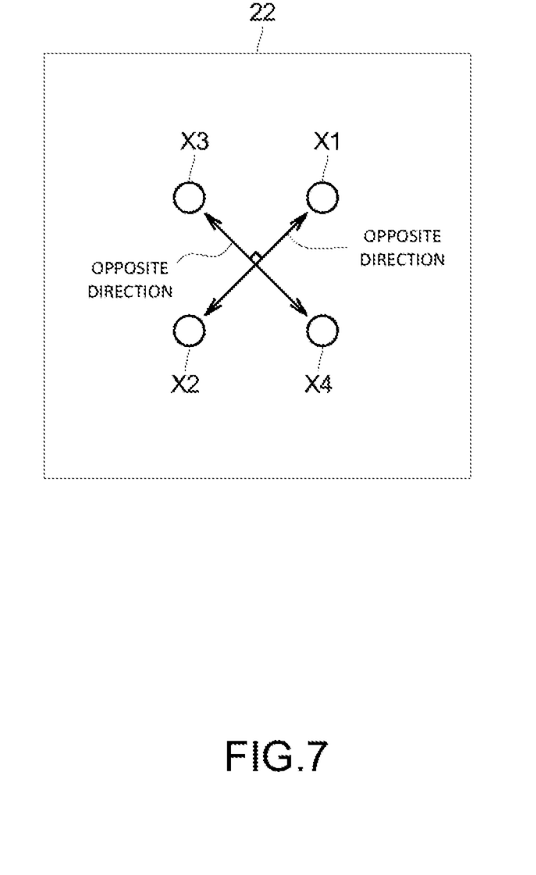
FIG. 7 is a front view showing a positional relationship among a reflecting position, an inlet and an outlet on one of the reflecting mirrors in accordance with a modified embodiment.

If each of the inlet X1 and the outlet X2 of the first light L1 is formed by a separate through bore, and each of the inlet X3 and the outlet X4 of the second light L2 is formed by a separate through bore, conceived is shown in FIG. 7. In other word, it can be conceived that an opposite direction of the inlet X1 and the outlet X2 and an opposite direction of the inlet X3 and the outlet X4 differ each other. In FIG. 7, these directions are formed to be orthogonal each other, however, it is not limited to this. In accordance with this arrangement wherein the inlets X1, 3 and the outlets X2, X4 are so formed, the entering direction and exiting direction of the second light L2 are formed to be located between a surface passing the entering direction of the first light L1 and a surface passing the exiting direction of the first light L1.

Furthermore, for example, the light may enter from a periphery of the reflecting mirror 22 to a space between a pair of the reflecting mirrors 22, 23 or exit from the space between a pair of the reflecting mirrors 22, 23 without providing a pair of the reflecting mirrors with an inlet and an outlet of the first light and the second light.

In addition, if the light source of the first light irradiation part 10A and the light source of the second light irradiation part 10B are separately provided so as to make a wavelength bandwidth of the first light L1 different from a wavelength bandwidth of the second light L2, it is also possible to measure a plurality of measuring objective components simultaneously.

The first light L1 and the second light L2 enter the multiple-reflection cell 20 simultaneously in the above-mentioned embodiment, however, they may enter with a time difference. In accordance with this arrangement, it is possible to detect the first light L1 and the second light L2 by using a single photoelectric detector, thereby simplifying the structure of the analysis device 100. In addition, the first light L1 and the second light L2 are made to be a pulse oscillated pulse light and to enter the multiple-reflection cell alternately.

In the above-mentioned embodiment explained is a case that the multiple-reflection cell 20 is a Heriot cell, however, the multiple-reflection cell 20 may be a White cell.

In addition to the measurement principle in the above-mentioned embodiment, the analysis device 100 may use, for example, an NDIR method, an FTIR method or an NDUV method.

The analysis device in accordance with the above-mentioned embodiment may analyze an exhaust gas exhausted from an exhaust pipe of an automobile on a chassis dynamometer or running on an actual road, an exhaust gas exhausted from an engine during a test by a power train test device, or exhaust gas exhausted from an engine tested by an engine dynamo. A pair of the reflecting mirrors tend to be dirty for the analysis device that analyzes the exhaust gas exhausted from the automobile. However, the analysis device in accordance with this invention has a pair of the reflecting mirrors and a pair of a purge mechanism for each reflecting mirror will do to clean the mirrors with spraying a purge gas, namely, only a pair of the purge mechanism will do, thereby simplifying the device structure.

Furthermore, the analysis device may have an arrangement to conduct the measurement by switching the optical path: in case that the concentration value of the measuring objective component obtained by the information processing unit is compared with a predetermined threshold value and the measuring objective component is bigger than the threshold value, a short optical path length (second light) is used for the measurement, and in case that the concentration of the measuring objective component is smaller than the threshold value, a long optical path length (first light) is used for the measurement.

The multiple-reflection cell is configured by housing a pair or the reflecting mirrors in the cell body in the above-mentioned embodiment, however, the multiple-reflection cell may be configured by a space sandwiched by a pair of the reflecting mirrors without housing a pair of the reflecting mirrors in the cell body (having no cell body).

In addition, the sample gas is not limited to the exhaust gas and may be atmosphere, liquid or solid. In this sense, not only the measuring objective component is not limited to gas, and the present claimed invention may be applied to liquid or solid. In addition, it is possible to apply this invention not to the absorbance of the light penetrating and passing the measuring object but also to calculation of the absorbance due to reflection.

Figure 8:
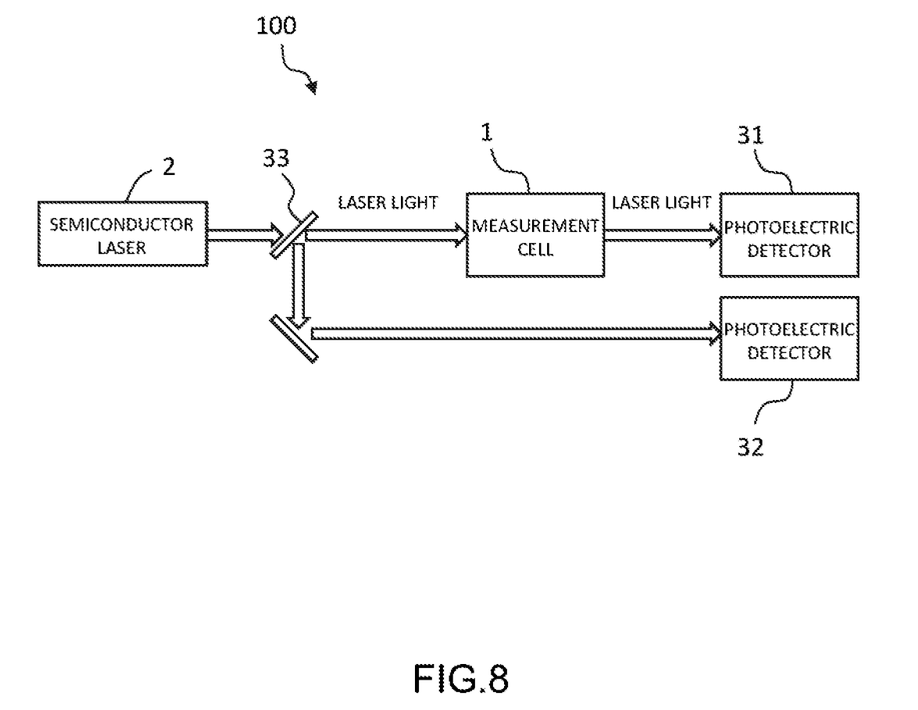
FIG. 8 is a pattern view showing a principal part of an analysis device of a modified embodiment.

The sample measurement and the reference measurement are conducted by the use of a single photoelectric detector in the above-mentioned embodiment, however, as shown in FIG. 8, two photoelectric detectors 31, 32 may be used and one photoelectric detector 31 may be for the sample measurement and the other photoelectric detector 32 may be for the reference measurement. In this case, the light from the light source 2 is branched by a half mirror 33. In addition, the reference cell may be arranged on the optical path for the reference measurement. It can be conceived that zero gas or a reference gas whose concentration is known is enclosed in the reference cell.

The light source is not limited to the semiconductor laser, and may be any other type as long as it is a short wavelength light source having a half-value width enough to secure the measurement accuracy and it can conduct wavelength modulation.

The present claimed invention may be variously modified without departing from the spirit of the invention.

EXPLANATION OF CODES

100 . . . analysis device
10A . . . first light irradiation part
L1 . . . first light
10B . . . second light irradiation part
L2 . . . second light
20 . . . multiple-reflection cell
21 . . . cell body
22 . . . one reflecting mirror
23 . . . other reflecting mirror
X1 . . . inlet of first light
X2 . . . outlet of first light
X3 . . . inlet of second light
X4 . . . outlet of second light
P1 . . . introducing port
P2 . . . discharging port
211 . . . optical window member
30A . . . first photoelectric detector
30B . . . second photoelectric detector

The invention claimed is:

1. An analysis device that irradiates a light entering a multiple-reflection cell into which a sample is introduced, detects the light exiting the multiple-reflection cell, and analyzes a measurement objective component contained in the sample, comprising:
   a first light irradiation part that allows a first light to enter the multiple-reflection cell; and
   a second light irradiation part that allows a second light whose incident optical path is different from that of the first light to enter the multiple-reflection cell, wherein
   the multiple-reflection cell has a pair of reflecting toroidal mirrors provided with their concave surfaces facing each other that reflect the first light and the second light,
   each of the reflecting toroidal mirrors is an aspherical mirror having two axes orthogonal to each other, with one of the axes having a different radius of curvature from the other of the axes,
   a number of reflections of the first light by the pair of reflecting toroidal mirrors and a number of reflections of the second light by the pair of reflecting toroidal mirrors are different from each other, and
   an inlet and an outlet of at least one of the first light and the second light are formed at different positions from each other in the multiple-reflection cell.

2. The analysis device described in claim 1, wherein
the multiple-reflection cell has an arrangement,
the first light and the second light enter from one of the reflecting toroidal mirrors, and
the first light and the second light exit from a same one of the reflecting toroidal mirrors.

3. The analysis device described in claim 1, wherein
an inlet and an outlet of the first light and an inlet and an outlet of the second light are formed only on one of the reflecting toroidal mirrors.

4. The analysis device described in claim 3, wherein
a position where each of the inlet and the outlet of the first light is formed is different from a reflecting position of the second light by the pair of the reflecting toroidal mirrors, and
a position where each of the inlet and the outlet of the second light is formed is different from a reflecting position of the first fight by the pair of the reflecting toroidal mirrors.

5. The analysis device described in claim 1, comprising
a cell body that houses the pair of the reflecting toroidal mirrors and that has an introducing port from which the sample is introduced and a discharging port from which the sample is discharged, wherein
the cell body has one optical window member from which the first light and the second light enter and exit.

6. The analysis device described in claim 1, wherein
the first light is reflected multiple times by the pair of the reflecting toroidal mirrors and outputted, and the second light is reflected a number of multiple times less than that of the first light by the pair of the reflecting toroidal mirrors, or reflected once by one of the reflecting toroidal mirrors and outputted.

7. The analysis device described in claim 1, wherein a first light irradiation part and a second light irradiation part allow the first light and the second light to enter the multiple-reflection cell simultaneously.

8. The analysis device described in claim 1, and further comprising an information processing unit that analyzes the measurement objective component having a low concentration based on a light intensity signal obtained by detecting the first light exiting from the multiple-reflection cell and that analyzes the measurement objective component having a high concentration based on a light intensity signal obtained by detecting the second light exiting from the multiple-reflection cell.

9. The analysis device described in claim 1, and further comprising an information processing unit that analyzes a first measurement objective component based on a light intensity signal obtained by detecting the first light exiting from the multiple-reflection cell and that analyzes a second measurement objective component based on a light intensity signal obtained by detecting the second light exiting from the multiple-reflection cell.

10. A multiple-reflection cell into which a sample is introduced and that outputs a light alter reflecting the light at multiple times, the multiple-reflection cell comprising:
  a pair of reflecting toroidal mirrors provided with their concave surfaces facing each other that reflect a first light and a second light each having mutually different incident optical paths, wherein
  each of the reflecting toroidal mirrors is an aspherical mirror having two axes orthogonal to each other, with one of the axes having a different radius of curvature from the other of the axes,
  a number of reflections of the first light by the pair of reflecting toroidal mirrors and a number of reflections of the second light by the pair of reflecting toroidal mirrors are different from each other
  the pair of the reflecting toroidal mirrors form a long optical length by reflecting the first light, and form a short optical length by reflecting the second light, and
  an inlet and an outlet of at least one of the first light and the second light are formed at different positions from each other in the multiple-reflection-cell.

11. An analysis method comprising:
  irradiating a light to a multiple-reflection cell into which a sample is introduced;
  detecting the light exiting from the multiple-reflection cell; and
  analyzing a measurement objective component contained in the sample, wherein
  a long optical length is formed by a first light and a short optical length is formed by a second light by allowing the first light and the second light each having mutually different incident optical paths to enter the multiple-reflection cell and by reflecting the first light and the second light by a pair of reflecting toroidal mirrors provided with their concave surfaces facing each other in the multiple-reflection cell,
  each of the reflecting toroidal mirrors is an aspherical mirror having two axes orthogonal to each other, with one of the axes having a different radius of curvature from the other of the axes, and
  a number of reflections of the first light by the pair of reflecting toroidal mirrors and a number of reflections of the second light by the pair of reflecting toroidal mirrors are different from each other.

12. The analysis device described in claim 1, wherein the number of reflections of the second light by the pair of reflecting toroidal mirrors is one.

* * * * *